United States Patent [19]

Nakagawa et al.

[11] 4,278,779

[45] Jul. 14, 1981

[54] AROMATIC POLYAMIDE COMPOSITION

[76] Inventors: Yasuo Nakagawa, 1-28-4-205, Ozu-cho; Keizo Shimada, 3-1-40, Yamate-cho; Tsutomu Nakamura, 1-28-2, Ozu-cho; Kichiro Matsuda, 5-17-29, Nishimi, all of Iwakuni-shi, Yamaguchi-ken, Japan

[21] Appl. No.: 58,920

[22] Filed: Jul. 19, 1979

[30] Foreign Application Priority Data

Jul. 31, 1978 [JP] Japan ................... 53-92646

[51] Int. Cl.$^3$ ............................. C08L 77/00
[52] U.S. Cl. ................... 525/432; 264/176 F
[58] Field of Search ......................... 525/432

[56] References Cited

U.S. PATENT DOCUMENTS

| | | | |
|---|---|---|---|
| 4,081,430 | 3/1978 | Minami | 525/432 |
| 4,098,360 | 7/1978 | Etou | 525/432 |
| 4,120,914 | 10/1978 | Behnke | 525/432 |
| 4,198,494 | 4/1980 | Burckel | 525/432 |

OTHER PUBLICATIONS

Chemical Abstracts, vol. 86 (1977) #74809t Japan Kokai 76 96,507, Uchiyama, Shcichi et al.

*Primary Examiner*—Paul Lieberman

[57] ABSTRACT

An aromatic polyamide composition which is suitable for producing filaments or fibers having an excellent heat-resisting property and a superior dyeing property, which comprises:
(A) 50 to 95% by weight of poly-m-phenylene isophthalamide, and;
(B) 5 to 50% by weight of at least one other aromatic polyamide comprising:
(1) an amine moiety consisting essentially of (a) 35 to 100 molar % of at least one xylylene diamine and, (b) 0 to 65 molar % of at least one other aromatic diamine, and;
(2) an acid moiety consisting essentially of at least one aromatic dicarboxylic acid.

12 Claims, No Drawings

AROMATIC POLYAMIDE COMPOSITION

The present invention relates to an aromatic polyamide composition. More particularly, the present invention relates to an aromatic polyamide composition suitable for producing filaments or fibers having an excellent dying property and superior heat-resisting properties.

It is known that the so-called wholly aromatic polyamide resins have higher softening and melting points than those of aliphatic polyamide resins, and exhibit desirable physical and chemical properties, such as: excellent heat-resisting properties, for example, a high ratio of mechanical strength at an elevated temperature to that at a room temperature, superior stabilities in dimension and shape at an elevated temperature, and a high resistance to thermal decomposition; high resistances to various chemicals; superior electrical properties, for example, a high dielectric breakdown strength, and; superior mechanical properties, for example, a high tensile strength and high Young's modules. Also, it is known that the wholly aromatic polyamide resins have high orienting and crystallizing properties. Accordingly, the wholly aromatic polyamide resins are suitable as a material for producing filaments, fibers and films having a high heat resistance, a superior flame-retarding property, and high tensile strength and Young's modulus.

However, the conventional filaments or fibers consisting of the wholly aromatic polyamide exhibit a disadvantage in that it is difficult to dye the filaments or fibers by conventional dyeing procedures, due to the high degrees of orientation and crystallinity thereof. Accordingly, the conventional wholly aromatic polyamide filaments or fibers are utilized, in the non-dyed form, as electric insulating material for motors and transformers, or as industrial materials for producing filter bags or heating tubes, which materials are not required to be colored. However, the conventional wholly aromatic polyamide filaments or fibers are not used as materials which are required to be beautifully colored, for example as, materials for clothing. Accordingly, it is desirable to provide a new type of aromatic polyamide material which is suitable for producing the filaments or fibers which can be easily dyed with conventional dyes.

Japanese Patent Application Publication No. 45-34776(1970) disclosed a method for producing filaments or fibers from a modified aromatic polyamide copolymer which contains repeating units having a functional radical which exhibits a high degree of affinity to dyes, for example, a sulfonic acid radical, a tertiary amino radical and a quaternary ammonium radical. Also, each of Japanese Patent Application Publications Nos. 49-32658(1974), 49-32659(1974), 49-33594(1974) and 50-8106(1975) disclosed a method for producing filaments or fibers from a composition containing the above-mentioned modified aromatic polyamide copolymer and a non-modified wholly aromatic polyamide. However, it was found that the above-mentioned fibers or filaments exhibited a significantly poor heat resisting property, which is very important when they are used practically, while the filaments or fibers exhibited an enhanced dyeing property.

For example, Japanese Patent Application Publication No. 49-32659(1974) disclosed an aromatic polyamide composition comprising a non-modified wholly aromatic polyamide and a modified aromatic polyamide containing, as an indispensable comonomer, a sulfone-substituted xylylene diamine, and a method for producing filaments or fibers from the above-mentioned aromatic polyamide composition. According to the process of the above-mentioned publication, the filaments produced from the aromatic polyamide composition were heat treated in a relaxed condition, at a temperature of 250° C., for 20 minutes, so as to reduce the thermal shrinkage of the filaments. The resultant filaments exhibited an improved dyeing property. However, in spite of the above-mentioned relaxing operation, the relaxed filaments exhibited an undesirably large shrinkage of more than 30% at a temperature of 300° C. The above-mentioned publications contained no example in which the aromatic polyamide filaments are produced from the compositions at a high temperature of 300° C. or more. Also, it was found that the shaped articles such as filaments and films, made of the compositions disclosed in the above-mentioned publications tended to readily shrink, decompose, discolor or deteriorate at a high temperature of 300° C. or more.

Accordingly, it is clear that the above-mentioned conventional aromatic polyamide compositions are not suitable as materials for producing the shaped articles which are highly resistant to a high temperature of 300° C. or more. This is because the sulfone radical or its alkali metal, or alkaline earth metal salt radical, in the compositions has a poor thermal stability.

An object of the present invention is to provide an aromatic polyamide composition which is suitable for producing filaments or fibers having not only an excellent dyeing property but, also, a superior heat resisting property.

The above-mentioned object can be attained by the aromatic polyamide composition of the present invention which comprises:
(A) 50 to 95% by weight of poly-m-phenylene isophthalamide, and;
(B) 5 to 50% by weight of at least one other aromatic polyamide comprising:
  (1) an amine moiety consisting essentially of (a) 35 to 100 molar % of at least one xylylene diamine and, (b) 0 to 65 molar % of at least one other aromatic diamine, and;
  (2) an acid moiety consisting of essentially of at least one aromatic dicarboxylic acid.

The aromatic polyamide composition of the present invention comprises 50 to 95% by weight of poly-m-phenylene isophthalamide (A) and 5 to 50% by weight of at least one other aromatic polyamide (B). When the content of the other aromatic polyamide (B) is less than 5% by weight, the filaments made of the resultant composition will exhibit a poor dyeing property even if the heat resistance, for example, thermal shrinkage at a temperature of 300° C., of the filaments is satisfactory. If the content of the other aromatic polyamide (B) in the composition is more than 50% by weight, the resultant filaments will exhibit a very poor heat resistance, for example, a thermal shrinkage of more than 30% at 300° C., while the dyeing property of the filaments is satisfactory.

It is preferable that the content of the other aromatic polyamide (B) in the composition of the present invention be in a range of from 5 to 30% by weight, more preferably, from 10 to 20% by weight.

The other aromatic polyamide (B) in the composition of the present invention comprises an amine moiety (1)

consisting essentially of 35 to 100 molar % of at least one xylylene diamine (a) and 0 to 65 molar % of at least one other aromatic diamine (b), and an acid moiety (2) consisting essentially of at least one aromatic dicarboxylic acid, and polycondensed with the amine moiety (1).

If the content of the xylylene diamine (a) in the amine moiety (1) is less than 35 molar %, the resultant filaments or fibers will exhibit a remarkably poor dyeing property. Preferably, the content of the xylylene diamine (a) in the amine moiety (1) is in a range of from 50 to 100 molar %, more preferably, from 75 to 100 molar %.

The xylylene diamine is preferably oriented either meta or para. That is, the xylylene diamine is preferably selected from the group consisting of m-xylylene diamine and p-xylylene diamine. The xylylene diamine may be either unsubstituted or substituted with at least one substituent which is not reactive to acid halide radicals and amino radicals and which is bonded to the aromatic ring, that is the, benzene ring, of the xylylene diamine. The substituent may be selected from the group consisting of halogen atoms, for example, chlorine and bromine, alkyl radicals preferably having 1 to 4 carbon atoms, for example, methyl, ethyl, propyl, and butyl, a phenyl, carboalkoxy radicals in which the alkoxy group preferably has 1 to 3 carbon atoms, for example, methoxy, ethoxy and propoxy, alkoxy radicals preferably having 1 to 3 carbon atoms, for example, methoxy, ethyoxy and propoxy, a nitro radical and thioalkyl preferably having 1 to 3 carbon atoms, for example, thiomethyl and thioethyl.

The substituted xylylene diamine may be selected from the group consisting of chloro-xylylene diamine, methyl-p-xylylene diamine, methoxy-p-xylylene diamine, 3-chloro-1,5-xylylene diamine, 2-chloro-1,5-xylylene diamine and 2,5-dichloro-1,4-xylylene diamine.

It is preferable that the other aromatic diamine (b) be selected from the group consisting of phenylene diamines, naphthylene diamines, biphenylene diamines, diphenylether diamines, diphenylthioether diamines, diphenylmethane diamines and diphenylsulfone diamines. The other aromatic diamines may be either unsubstituted or substituted with at least one substituent which is not reactive to acid halide radicals and amine radicals, and which is bonded to the aromatic ring or rings in the aromatic diamine. The substituent may be selected from the group consisting of halogen atoms, alkyl radicals preferably having 1 to 4 carbon atoms, a phenyl radical, carboalkoxy radicals in which the alkoxy group preferably has 1 to 3 carbon atoms, a nitro group, alkoxy radicals preferably having 1 to 3 carbon atoms and thioalkyl radicals preferably having 1 to 3 carbon atoms.

The unsubstituted and substituted other aromatic diamines (b) include p-phenylene diamine, m-phenylene diamine, 2,4-toluylene diamine, 2,6-toluylene diamine, 2,4-diaminochlorobenzene, 2,6-naphthylene diamine, 4,4'-biphenylene diamine, 4,4'-diaminodiphenyl ether, 3,4'-diaminodiphenyl ether, 4,4'-diaminodiphenyl methane, 4,4'-diaminodiphenyl sulfone and 3,3'-diaminodiphenyl sulfone. Preferably, the other aromatic diamine (b) is selected from the group consisting of p-phenylene diamine, m-phenylene diamine, 2,4-toluylene diamine, 2,6-toluylene diamine, 2,4-diaminochlorobenzene, 4,4'-diaminodiphenyl methane, 4,4'-diaminodiphenyl ether, 4,4'-diaminodiphenyl sulfone, 3,3'-diaminodiphenyl sulfone, and 4,4'-diaminodiphenyl ether. More preferable aromatic diamine (b) includes m-phenylene diamine, 2,4-toluylene diamine and 2,6-toluylene diamine.

The aromatic dicarboxylic acid as the acid moiety (2) in the other aromatic polyamide (B) includes phenylene dicarboxylic acids and naphthalene dicarboxylic acids. The aromatic dicarboxylic acid may be either unsubstituted or substituted with at least one substituent which is bonded to the aromatic ring of the aromatic dicarboxylic acid and which is not reactive to acid halide radicals and amino radicals. The substituent in the aromatic dicarboxylic acid may be selected from the group consisting of halogen atoms, alkyl radicals preferably having 1 to 4 carbon atoms, a phenyl radical, carboalkoxy radicals in which the alkoxy group preferably has 1 to 3 carbon atoms, alkoxy radicals preferably having 1 to 3 carbon atoms, a nitro radical and thioalkyl radicals preferably having 1 to 3 carbon atoms.

The aromatic dicarboxylic acid usable as the acid moiety (2) in the other aromatic polyamide (B) include terephthalic acid, monochloroterephthalic acid, dichloroterephthalic acid, tetrachloroterephthalic acid, methyl terephthalic acid, isophthalic acid and 2,6-naphthalene dicarboxylic acid. It is preferable that the aromatic dicarboxylic acid be selected from the group consisting of terephthalic acid, isophthalic acid and 2,6-naphthalene dicarboxylic acid. More preferable aromatic dicarboxylic acid is terephthalic acid or isophthalic acid.

In the aromatic polyamide composition of the present invention, it is preferable that the poly-m-phenylene isophthalamide (A) have an inherent viscosity of from 1.0 to 3.0 and the other aromatic polyamide (B) have an inherent viscosity of from 0.1 to 1.5. The inherent viscosity (I.V.) is determined by measuring the viscosity (yr) of a solution of the polymer in concentrated sulfuric acid, at a predetermined concentration (C) in g/dl and a temperature of 30° C., and by converting the value of the viscosity (yr) into a value of I.V. in accordance with the equation:

$$I.V. = (\ln yr)/C$$

The poly-m-phenylene isophthalamide (A) and the other aromatic polyamide (B) may each be prepared by any of the conventional polymerization processes, for instance, a solution polymerization process, an interfacial polymerization process and a melt polymerization process. In the polymerization process, the aromatic dicarboxylic acid as an acid moiety (2) may be either in the form of free acid or in the form of a polymerization active derivative thereof, for instance, a lower alkyl ester or an acid halide. It is preferable that the aromatic dicarboxylic acid be used in the form of an acid halide, more preferably, an acid chloride.

The poly-m-phenylene isophthalamide (A) may contain 10 molar % or less of an acid moiety other than the isophthalic acid moiety and/or an amine moiety other than the m-phenylene diamine moiety. The other acid moiety may consist of at least one member selected from the group consisting of terephthalic acid, monochloroterephthalic acid, methylterephthalic acid, dichloroterephthalic acid, tetrachloroterephthalic acid and 2,6-naphthalene dicarboxylic acid. The other amine moiety may consist of at least one member selected from the group consisting of p-phenylene diamine, 2,4-toluylene diamine, 2,6-toluylene diamine, 2,4-diaminochlorobenzene, 4,4'-diphenylene diamine and 4,4'- diaminodiphenyl ether. The aromatic polyamide composition may contain additives, for example, photostabilizer, flame retardant, anti-oxidant and anti-static agent, unless the additive adversely affects an object of the present invention.

The aromatic polyamide composition of the present invention can be prepared by uniformly blending the poly-m-phenylene isophthalamide (A) with the other aromatic polyamide (B) by any conventional blending process. For example, the poly-m-phenylene isophthalamide (A) and the other aromatic polyamide (B) may be dissolved together in a basic amide solvent, for instance, N,N'-dimethyl formamide, N,N'-dimethyl acetamide or N-methyl-2-pyrrolidone. The solution can be used for producing filaments, films, fibrids and another shaped articles therefrom. The solution may be prepared by any dissolving method. For example, both the polymers (A) and (B) can be simultaneously dissolved in one solvent. The polymers (A) and (B) may be dissolved separately in separate solvents, and the resultant separate solutions may be mixed together so as to form one solution. Otherwise, either one of the polymers (A) and (B) is dissolved in one solvent to provide a solution and, then, the remaining polymer is added into the solution. When either one of the polymers (A) and (B) is prepared by means of a solution polymerization, the remaining polymer may be added, after the completion of the polymerization, into the resultant polymerization solution, or before the start of the polymerization, into the solution polymerization mixture.

The aromatic polyamide composition of the present invention is useful for producing filaments or fibers therefrom. The aromatic polyamide filaments can be produced by any spinning process, for example, a dry spinning process, a wet spinning process or a semi-dry wet process. In each process, a solution of the aromatic polyamide composition in a solvent is extruded through a number of spinning holes and the extruded filamentary streams of the solution are solidified. The solidified filaments are bundled, preferably washed with water and, then, subjected to a drawing process. In the drawing process, the filaments are drawn at a draw ratio of from 1.5 to 5.0 in a proper drawing medium, for example, hot water, an organic liquid or an aqueous solution of a salt, at a temperature of up to 100° C., or in a steam atmosphere at a temperature of from 100° to 160° C. Thereafter, the drawn filaments are heat treated under tension or, preferably, heat drawn at a temperature of 280° C. or more. The heat drawing process may be carried out at a draw ratio of 1.05 to 5.0.

In order to produce the aromatic polyamide filaments or fibers having an excellent dyeing property and a superior heat-resisting property, it is necessary to adjust the proportions of the m-phenylene isophthal-amide (A) and the other aromatic polyamide (B) in the composition, and the proportions of the xylylene diamine (a) and the other aromatic diamine (b) in the amine moiety (1), respectively, to a value within the ranges as defined hereinabove. Also, it is preferable that the spinning, drawing and heat-treating operations for producing the aromatic polyamide filaments be, respectively, carried out under the afore-mentioned conditions.

The filaments or fibers made from the aromatic polyamide composition of the present invention can be dyed not only with conventional acid dyes and disperse dyes but, also, with conventional cationic dyes, and the dyed filaments can exhibit dyeing fastnesses sufficient for practical use.

The following specific examples are presented for the purpose of clarifying the present invention. However, it should be understood that these examples are intended only to illustrate the present invention and are not intended to limit the scope of the present invention in any way.

In the Examples, as a typical heat-resisting property of the filaments, a thermal shrinkage of the filaments at a temperature of 300° C. was measured. The thermal shrinkage was determined in such a manner that a portion of a filament having a length (lo) was marked, the filament was relaxed in a hot air atmosphere, at a temperature of 300° C., for 30 minutes and, then, a length (l) of the marked portion of the filament was measured. The thermal shrinkage (S 300) in percent was calculated in accordance with the following equation.

$$S\ 300(\%) = \frac{l_o - l}{l_o} \times 100$$

The dyeing property of the filaments was determined in the following manner.

10.0 g of filaments was immersed in a dyeing liquor having the following composition.
C.I. Acid Blue 102: 0.6 g
Ammonium sulfate: 22.5 g
Acetic acid: 6.0 g
p-phenyl phenol: 2.0 g
Water: 300 ml The dyeing liquor was heated to a temperature of 130° C. and maintained at this temperature for 90 minutes, while stirring the dyeing liquor. The filaments were removed from the dyeing liquor and washed with a solution of 0.5 g of sodium carbonate in 300 ml of water, at a temperature of 80° C., for 20 minutes, and then, with fresh water. After drying, the filaments were subjected to measurement of their reflectivity in the following manner.

0.5 g of the dyed filaments were placed evenly in a cell, and the cell was placed in a spectrophotometer and exposed to light having a wave length of 500 millimicrons to measure a reflectivity (R). A K/S value of the filaments was determined in accordance with the following equation.

$$K/S = \frac{(1 - R)^2}{2R}$$

EXAMPLES 1 THROUGH 3 AND COMPARISON EXAMPLE 1

In each of the Examples 1 through 3, a poly-m-phenylene isophthalamide (A) having an inherent viscosity of 1.80 was prepared by polycondensing m-phenylene diamine with isophthalic acid chloride.

Separately, an aromatic polyamide (B) was prepared in the following manner. 152.5 parts by weight of isophthalic acid chloride was dissolved in 2500 parts by weight of tetrahydrofuran, and the resultant solution was cooled to a temperature of 0° C. Separately, 102.3 parts by weight of m-xylylene diamine and 113.3 parts by weight of anhydrous sodium carbonate were dissolved in 2500 parts by weight of water, and the resultant solution was cooled to a temperature of 5° C. The isophthalic acid chloride solution was mixed with the m-xylylene diamine solution while vigorously stirring the mixture. Three minutes after the mixing, 2500 parts by weight of water were added to the mixture and the resultant mixture was stirred for 5 minutes. The resultant polymer was separated from the mixture by means of filtering, washed with water three times and, then, dried at a temperature of 100° C. under a reduced pressure. The resultant poly-m-xylylene isophthalamide exhibited an inherent viscosity of 0.73.

The poly-m-phenylene isophthalamide and the polyxylylene isophthalamide prepared as mentioned above were dissolved in proportions as indicated in Table 1 in N-methyl-2-pyrrolidone. In the resultant solution, the concentration of the sum of the poly-m-phenylene isophthalamide and the poly-m-xylylene isophthalamide was 20.0% by weight. The solution was extruded at a velocity of 4.0 m/minute through 100 spinning holes, each having a diameter of 0.08 mm, into an aqueous coagulating solution containing mainly calcium chloride. The coagulated aromatic polyamide filaments were washed with water and, then, drawn at a draw ratio of 2.30 in boiling water. The drawn filaments were additionally drawn on a hot plate having a temperature shown in Table 1, at a draw ratio of 1.82, and then, wound on a bobbin. Various properties of the resultant filaments are shown in Table 1.

In Comparison Example 1, the same procedures as those mentioned in Examples 1 through 3 were carried out, except that no poly-m-xylylene isophthalamide (B) was used. Various properties of the resultant comparative filaments are shown in Table 1.

EXAMPLES 4 THROUGH 6

In Examples 4 through 6, procedures respectively identical to those described in Examples 1 through 3 were used except that a poly-m-xylylene isophthalamide (B) was prepared by the following method.

A solution of 204.6 parts by weight of m-xylylene diamine in 1500 parts by weight of tetrahydrofuran was gradually added dropwise into a solution of 305.1 parts by weight of isophthalic acid chloride in 1500 parts by weight of tetrahydrofuran, which solution had been cooled to a temperature of 2° C. The resultant solution mixture containing an oligomer made of m-xylylene diamine and isophthalic acid chloride, was added into a solution of 223 parts by weight of anhydrous sodium carbonate in 3000 parts by weight of water, which solution had been cooled to a temperature of 5° C., while vigorously stirring the resultant polymerization mixture. Three minutes after the completion of the addition operation, 3000 parts by weight of water were added to the polymerization mixture and the mixture was stirred for 5 minutes. The resultant polymer was separated from the polymerization mixture by means of filtering, and the separated polymer was washed with about 3000 parts by weight of water. The filtering and washing operations were repeated three times. The resultant poly-m-xylylene isophthalamide exhibited an inherent viscosity of 0.42. Table 2 shows the proportions of the poly-m-phenylene isophthalamide and the poly-m-xylylene isophthalamide, the temperature of the drawing hot plate and various properties of the filaments in each of Examples 4 through 6.

TABLE 2

| | Composition | | | Filaments | | | |
| | poly-m-phenylene isophthalamide (A) (%) | Poly-m-xylylene isophthalamide (B) (%) | Temperature of drawing hot plate (°C.) | Tensile strength (g/d) | Ultimate elongation (%) | Shrinkage at 300° C. (%) | K/S |
| Example No. | | | | | | | |
| | | | 320 | 4.9 | 47 | 6.5 | 11.5 |
| 4 | 80 | 20 | 340 | 4.7 | 40 | 5.0 | 11.2 |
| | | | 360 | 4.3 | 38 | 5.5 | 10.4 |
| | | | 320 | 5.2 | 44 | 7.0 | 10.1 |
| 5 | 85 | 15 | 340 | 5.4 | 43 | 5.0 | 8.8 |
| | | | 360 | 5.0 | 40 | 5.0 | 9.0 |
| | | | 320 | 5.9 | 37 | 7.0 | 4.3 |
| 6 | 90 | 10 | 340 | 5.8 | 43 | 5.0 | 3.6 |
| | | | 360 | 5.2 | 42 | 5.0 | 3.6 |

In Example 7, procedures identical to those described in Example 2 were used, except that a poly-m-xylylene isophthalamide (B) was prepared by the following method.

TABLE 1

| | Composition | | | Filaments | | | |
| | poly-m-phenylene isophthalamide (A) (%) | Poly-m-xylylene isophthalamide (B) (%) | Temperature of drawing hot plate (°C.) | Tensile strength (g/d) | Ultimate elongation (%) | Shrinkage at 300° C. (%) | K/S |
| Example No. | | | | | | | |
| | | | 320 | 4.0 | 33 | 6.0 | 11.5 |
| 1 | 80 | 20 | 340 | 4.4 | 37 | 5.5 | 11.5 |
| | | | 360 | 4.2 | 40 | 5.0 | 10.9 |
| | | | 320 | 5.3 | 37 | 6.0 | 9.0 |
| Example 2 | 85 | 15 | 340 | 4.7 | 36 | 5.5 | 8.8 |
| | | | 360 | 5.2 | 38 | 5.5 | 10.4 |
| | | | 320 | 5.6 | 50 | 8.0 | 9.4 |
| 3 | 90 | 10 | 340 | 5.6 | 49 | 5.5 | 6.2 |
| | | | 360 | 5.2 | 54 | 4.5 | 7.8 |
| | | | 320 | 5.8 | 50 | 6.0 | 1.0 |
| Comparison Example 1 | 100 | 0 | 340 | 5.7 | 48 | 5.5 | 0.8 |
| | | | 360 | 5.4 | 45 | 4.5 | 0.9 |

A solution of 102.1 parts by weight of isophthalic acid chloride in 2500 parts by weight of tetrahydrofuran, which solution had been cooled to a temperature of 0° C., was mixed with a solution of 102.2 parts by weight of m-xylylene diamine and 75 parts by weight of anhydrous sodium carbonate in 2500 parts by weight of water, which solution had been cooled to a temperature of 2° C., while vigorously stirring the mixture. The mixture was additionally stirred for 3 minutes and mixed with 2500 parts by weight of water. The mixture was stirred for 5 minutes. The resultant polymer was filtered and the filtered polymer was washed with about 2500 parts by weight of water. The filtering and washing operations were repeated three times. The resultant poly-m-xylylene isophthalamide exhibited an inherent viscosity of 0.61. This polymer is referred to as polyamide B-1 in Table 3.

In Example 8, the same procedures as those described in Example 7 were used, except that the isophthalic acid chloride was used in an amount of 228.6 parts by weight and the resultant poly-m-xylylene isophthalamide exhibited an inherent viscosity of 0.36. This polymer is referred to as polyamide B-2 in Table 3.

TABLE 3

| Example No. | Polyamide | Temperature of drawing hot plate (°C.) | Tensile strength (g/d) | Ultimate elongation (%) | Shrinkage at 300° C. (%) | K/S |
|---|---|---|---|---|---|---|
|   |     | 320 | 5.1 | 45 | 6.0 | 9.4 |
| 7 | B-1 | 340 | 5.1 | 35 | 5.0 | 9.4 |
|   |     | 360 | 4.3 | 33 | 4.5 | 11.5 |
| 8 | B-2 | 320 | 4.9 | 36 | 4.0 | 9.2 |
|   |     | 340 | 4.6 | 36 | 3.5 | 9.0 |

EXAMPLES 9 THROUGH 11

In each of the Examples 9 through 11, the same procedures as those mentioned in Example 1 were, except that the aromatic polyamide (B) was prepared in the following manner.

A solution of m-xylylene diamine, in an amount indicated in Table 4, and 13.40 g of anhydrous sodium carbonate in 300 ml of water was cooled to a temperature of 5° C., and then, mixed with a solution of isophthalic acid chloride and terephthalic acid chloride, respectively, in amounts indicated in Table 4, in 300 mol of tetrahydrofuran, which solution had been cooled to a temperature of 2° C., while vigorously stirring the mixture. After additional stirring for 3 minutes, 500 ml of water was added and, then, the mixture was stirred for 5 minutes. The resultant polymer was separated from the mixture by means of filtration and washed with about 500 ml of water. The filtering and washing operations were repeated three times. The resultant aromatic polyamide (B) exhibited an inherent viscosity as indicated in Table 4.

The proportion of the aromatic polyamide (B) in the composition was 20% by weight, and the temperature of the drawing hot plate was 350° C.

The results of Examples 9 through 11 are shown in Table 4.

TABLE 4

| Aromatic Polyamide (B) | | | | | Temperature of drawing hot plate (°C.) | Filament | | | |
|---|---|---|---|---|---|---|---|---|---|
| Amine moiety M-xylylene diamine (g) | Acid moiety | | Molar percent of TPC IPC + TPC | I.V. | | Tensile strength (g/d) | Ultimate elongation (%) | Shrinkage at 300° C. (%) | K/S |
| | Isophthalic acid chloride (IPC) (g) | Terephthalic acid chloride (TPC) (g) | | | | | | | |
| 12.262 | 13.708 | 4.570 | 25 | 0.96 | 350 | 4.2 | 36 | 18.6 | 7.7 |
| 12.263 | 9.140 | 9.140 | 50 | 1.11 | 350 | 3.1 | 45 | 7.0 | 7.4 |
| 12.260 | 4.569 | 13.707 | 75 | 1.06 | 350 | 3.0 | 45 | 7.0 | 8.3 |

EXAMPLE 12

An aromatic polyamide (B) was prepared in the following manner.

A solution of 81.72 g of p-xylylene diamine in 1500 ml of tetrahydrofuran was gradually dropwise into a solution of 121.82 g of isophthalic acid chloride in 1500 ml of tetrahydrofuran and having a temperature of 2° C., while stirring the mixture. The mixture which contains the resultant oligomer from the p-xylylene diamine and the isophthalic acid chloride, was mixed with a solution of 102 g of anhydrous sodium carbonate in 3000 ml of water and having a temperature of 5° C., while vigorously stirring the mixture, and then, the mixture was additionally stirred for 5 minutes. Thereafter, about 3000 ml of water were added to the mixture while vigorously stirring the mixture, and the stirring operation was held for 10 minutes. The resultant polymer was filtered from the mixture and washed with about 5000 ml of water. The filtering and washing operations were repeated 3 times. The resultant aromatic polyamide (B), that is poly-p-xylylene isophthalamide, had an inherent viscosity of 0.63.

A composition solution was prepared by dissolving 85 parts by weight of the same poly-m-phenylene isophthalamide (A) as that mentioned in Example 1 and 15 parts by weight of the above-prepared poly-p-xylylene isophthalamide (B) in N-methyl-2-pyrrolidone. The concentration of the sum of the poly-m-phenylene isophthalamide (A) and the poly-p-xylylene isophthalamide (B) in the composition solution was 20.0% by weight.

The composition solution was extruded through 40 spinning holes, each having a diameter of 0.08 mm, into a coagulating solution containing mainly calcium chloride at a speed of 4.0 m/min. The coagulated filaments were washed with water, drawn in boiling water at a draw ratio indicated in Table 5 and, then, additionally drawn on a hot plate having a temperature indicated in Table 5 at a draw ratio indicated in Table 4. The drawn filaments were wound on a bobbin by using a winder.

The properties of the resulting filaments are shown in Table 5.

TABLE 5

| Draw ratio in boiling water | Drawing on hot plate Draw ratio | Temperature (°C) | Tensile strength (g/d) | Ultimate elongation (%) | Shrinkage at 300° C. (%) | K/S |
|---|---|---|---|---|---|---|
| 2.30 | 1.82 | 360 | 4.6 | 44 | 4.0 | 11.8 |
| 2.30 | 1.82 | 340 | 5.2 | 49 | 4.5 | 10.7 |
| 2.30 | 1.82 | 320 | 5.1 | 52 | 6.5 | 11.2 |
| 3.00 | 1.67 | 360 | 6.3 | 32 | 4.0 | 5.0 |
| 3.00 | 1.20 | 360 | 3.8 | 58 | 7.0 | 14.7 |
| 3.00 | 1.67 | 340 | 7.0 | 31 | 4.5 | 3.7 |
| 3.00 | 1.20 | 340 | 4.4 | 57 | 6.5 | 12.9 |
| 3.00 | 1.05 | 340 | 3.7 | 65 | 17.0 | 19.0 |
| 3.00 | 1.67 | 320 | 6.7 | 27 | 5.0 | 4.0 |
| 3.00 | 1.20 | 320 | 4.4 | 55 | 7.5 | 15.1 |
| 3.00 | 1.50 | 320 | 4.3 | 70 | 17.0 | 16.3 |

EXAMPLES 13 THROUGH 17 AND COMPARISON EXAMPLES 2 THROUGH 4

In each of the Examples 13 through 17 and the Comparison Examples 2 through 4, an aromatic polyamide (B) was prepared in a composition indicated in Table 6, in a similar manner to that described in Example 12. In Table 5, the meanings of IPC, TPC, MPD, PXD and MXD are as follows.

IPC: isophthalic acid chloride
TPC: terephthalic acid chloride
MPD: m-phenylene diamine
PXD: p-xylylene diamine
MXD: m-xylylene diamine A composition solution was prepared by dissolving 80 parts by weight of the same m-phenylene isophthalamide (A) as that mentioned in Example 1 and 20 parts by weight of the above-mentioned aromatic polyamide (B) in N-methyl-2-pyrrolidone. The concentration of the sum of the poly-m-phenylene isophthalate (A) and the aromatic polyamide (B) in the solution was 20% by weight. Only in Example 17, did the composition solution contain 30 parts by weight of the aromatic polyamide (B) and the balance consisted of poly-m-phenylene isophthalamide (A).

The composition solution was extruded through 20 spinning holes, each having a diameter of 0.08 mm, into a coagulating solution containing mainly calcium chloride at a velocity of 6.0 m/min. The resultant filaments were washed with water, drawn at a draw ratio indicated in Table 6 in boiling water and, then, additionally drawn at a draw ratio as indicated in Table 6 on a hot plate having a temperature as indicated in Table 6. The properties of the resultant filaments are also shown in Table 6.

TABLE 6

| Example No. | Aromatic polyamide B | | | | | | Draw ratio in boiling water | Drawing on Hot plate | | Filament | | | |
|---|---|---|---|---|---|---|---|---|---|---|---|---|---|
| | Acid moiety (molar %) | | Amine moiety (molar %) | | | I.V | | Draw ratio | Temperature (°C) | Tensile strength (g/d) | Ultimate elongation (%) | Shrinkage at 300° C. (%) | K/S |
| | IPC | TPC | MPD | PXD | MXD | | | | | | | | |
| Example 13 | 70 | 30 | 0 | 100 | 0 | 0.85 | 2.30 | 1.80 | 330 | 3.3 | 62 | 28.5 | 15.7 |
| Example 14 | 100 | 0 | 0 | 70 | 30 | 0.74 | 2.30 | 1.80 | 300 | 4.1 | 63 | 28.5 | 12.9 |
| Example 15 | 100 | 0 | 30 | 70 | 0 | 0.55 | 2.30 | 1.80 | 330 | 3.1 | 43 | 12.0 | 9.7 |
| Example 16 | 30 | 70 | 0 | 15 | 85 | 0.86 | 2.30 | 1.80 | 300 | 4.6 | 46 | 10.0 | 12.2 |
| | | | | | | | 2.30 | 1.80 | 350 | 4.3 | 51 | 7.0 | 10.9 |
| Example 17 | 100 | 0 | 0 | 100 | 0 | 0.63 | 2.43 | 1.85 | 300 | 4.0 | 39 | 5.0 | 8.5 |
| | | | | | | | 2.43 | 1.85 | 350 | 3.1 | 22 | 4.5 | 7.5 |
| Comparison Example 2 | 100 | 0 | 70 | 30 | 0 | 2.09 | 2.50 | 2.00 | 300 | 5.9 | 34 | 11.0 | 1.4 |
| | | | | | | | 2.50 | 2.00 | 350 | 5.8 | 35 | 5.0 | 0.8 |
| Comparison Example 3 | 100 | 0 | 80 | 20 | 0 | 2.15 | 2.30 | 1.80 | 350 | 5.8 | 37 | 7.0 | 0.8 |
| Comparison Example 4 | 100 | 0 | 90 | 10 | 0 | 2.50 | 2.30 | 1.80 | 300 | 5.3 | 43 | 24.0 | 2.2 |
| | | | | | | | 2.30 | 1.80 | 350 | 5.7 | 41 | 5.0 | 1.1 |

EXAMPLES 18 THROUGH 36 AND COMPARISON EXAMPLES 5 THROUGH 13

In each of the Examples 18 through 36 and the Comparison Examples 5 through 13, an aromatic polyamide (B) was prepared from amine and acid compounds, the types and amounts of which are indicated in Table 7, by an interfacial polymerization method. The inherent viscosity of the resultant aromatic polyamide (B) are shown in Table 7.

A composition solution was prepared by dissolving 80 parts by weight of the same poly-m-phenylene isophthalamide as that mentioned in Example 1 and 20 parts by weight of the aromatic polyamide (B) in N-methyl-2-pyrrolidone, so that the concentration of the sum of the above-mentioned polymers became 20% by weight.

The composition solution was extruded through 20 spinning holes, each having a diameter of 0.08 mm, into a coagulating solution containing mainly calcium chloride at a velocity of 8.0 m/min. The coagulated filaments were washed with water and, then, subjected to a drawing operations indicated in Table 7.

In table 7, the meanings of TDA and SXD are as follows.

TDA: a toluylene diamine mixture, that is, a mixture of 20 parts by weight of 2,4-toluylene diamine and 80 parts by weight of 2,6-toluylene diamine.
SXD: a xylylene diamine mixture, that is, a mixture of 15 parts by weight of p-xylylene diamine and 85 parts by weight of m-xylylene diamine.

The properties of the resultant filaments are also shown in Table 7.

TABLE 7

| Example No. | Aromatic polyamide B | | | | | | Drawing | | | Filament | | | |
|---|---|---|---|---|---|---|---|---|---|---|---|---|---|
| | Acid moiety (molar %) | | Amine moiety (molar %) | | | | Draw ratio in boiling water | Drawing on Hot plate | | Tensile strength (g/d) | Ultimate elongation (%) | Shrinkage at 300° C. (%) | K/S |
| | IPC | TPC | MPD | TDA | MXD | I.V | | Draw ratio | Temperature (°C.) | | | | |
| Example 18 | 100 | 0 | 25 | 0 | 75 | 0.64 | 2.30 | 1.80 | 350 | 4.8 | 55 | 5.0 | 12.2 |
| | | | | | | | 3.50 | 1.30 | 350 | 5.4 | 46 | 4.0 | 11.5 |
| Example 19 | 100 | 0 | 50 | 0 | 50 | 0.61 | 2.30 | 1.80 | 350 | 3.5 | 66 | 19.5 | 15.1 |
| | | | | | | | 3.60 | 1.35 | 350 | 5.4 | 82 | 4.0 | 4.1 |
| Comparison Example 5 | 100 | 0 | 75 | 0 | 25 | 0.93 | 2.30 | 1.80 | 350 | 3.9 | 60 | 7.5 | 3.2 |
| | | | | | | | 3.20 | 1.35 | 350 | 4.8 | 73 | 6.0 | 2.3 |
| Example 20 | 0 | 100 | 25 | 0 | 75 | 1.03 | 2.30 | 1.80 | 330 | 3.0 | 40 | 8.0 | 15.7 |
| | | | | | | | 3.50 | 1.35 | 350 | 4.6 | 39 | 5.0 | 13.7 |
| Example 21 | 0 | 100 | 50 | 0 | 50 | 0.98 | | | | | | | |
| | | | | | | | 3.50 | 1.40 | 350 | 4.2 | 43 | 6.0 | 9.4 |
| Example 22 | 100 | 0 | 0 | 25 | 75 | 0.40 | 2.30 | 2.00 | 300 | 4.3 | 43 | 19.0 | 12.2 |
| | | | | | | | 2.30 | 1.80 | 340 | 3.1 | 51 | 5.5 | 12.2 |
| | | | | | | | 3.15 | 1.80 | 350 | 6.1 | 27 | 4.5 | 9.4 |
| Example 23 | 100 | 0 | 0 | 50 | 50 | 0.43 | | | | | | | |
| | | | | | | | 3.85 | 1.30 | 330 | 4.4 | 37 | 5.0 | 10.4 |
| Comparison Example 6 | 100 | 0 | 0 | 75 | 25 | 1.07 | 2.30 | 1.80 | 300 | 5.1 | 57 | 71 | 15.7 |
| | | | | | | | 2.30 | 1.80 | 340 | 3.9 | 65 | 63 | 21.7 |
| Comparison Example 7 | 100 | 0 | 0 | 85 | 15 | 1.56 | 2.30 | 1.80 | 300 | 5.7 | 57 | 73 | 10.4 |
| | | | | | | | 2.30 | 1.80 | 340 | 3.9 | 60 | 57 | 15.7 |
| Example 24 | 0 | 100 | 0 | 25 | 75 | 0.59 | | | | | | | |
| | | | | | | | 2.30 | 1.80 | 340 | 4.2 | 68 | 16 | 11.2 |
| Example 25 | 0 | 100 | 0 | 50 | 50 | 0.47 | | | | | | | |
| | | | | | | | 2.80 | 1.80 | 340 | 3.0 | 71 | 30 | 7.0 |
| Comparison Example 8 | 0 | 100 | 0 | 75 | 25 | 1.48 | 2.30 | 1.80 | 300 | 4.7 | 42 | 53 | 5.8 |
| | | | | | | | 2.30 | 1.80 | 350 | 3.7 | 65 | 67 | 10.4 |
| Comparison Example 9 | 0 | 100 | 0 | 85 | 15 | 1.99 | 2.30 | 1.80 | 300 | 2.7 | 11 | 75 | 3.7 |
| | | | | | | | 2.30 | 1.80 | 350 | 3.4 | 41 | 37 | 3.7 |
| Example 26 | 100 | 0 | 0 | 0 | 100 | 0.83 | 2.30 | 1.80 | 300 | 4.4 | 41 | 8.5 | 7.1 |
| | | | | | | | 2.30 | 1.80 | 340 | 3.4 | 39 | 5.0 | 8.6 |
| Example 27 | 75 | 25 | 0 | 0 | 100 | 0.85 | 2.30 | 1.80 | 300 | 4.4 | 46 | 17.0 | 8.6 |
| | | | | | | | 2.30 | 1.80 | 350 | 3.8 | 42 | 7.5 | 8.0 |
| Example 28 | 50 | 50 | 0 | 0 | 100 | 0.91 | 2.30 | 1.80 | 300 | 4.3 | 60 | 30.0 | 9.4 |
| | | | | | | | 2.30 | 1.80 | 350 | 3.5 | 49 | 7.0 | 7.7 |
| Example 29 | 30 | 70 | 0 | 0 | 100 | 0.86 | 2.30 | 1.80 | 300 | 4.6 | 46 | 10.0 | 12.2 |
| | | | | | | | 2.30 | 1.80 | 350 | 4.3 | 51 | 7.0 | 10.9 |
| Example 30 | 100 | 0 | 0 | 25 | 75 | 0.41 | 2.30 | 1.80 | 340 | 3.4 | 41 | 7.5 | 13.3 |
| | | | | | | | 3.40 | 1.40 | 350 | 4.9 | 31 | 5.0 | 10.9 |
| Example 31 | 100 | 0 | 0 | 50 | 50 | 0.42 | 2.30 | 1.80 | 340 | 3.3 | 53 | 8.0 | 14.6 |
| | | | | | | | 4.00 | 1.30 | 350 | 5.4 | 36 | 5.0 | 6.7 |
| Comparison Example 10 | 100 | 0 | 0 | 75 | 25 | 1.05 | 2.30 | 1.80 | 350 | 3.9 | 70 | 61.0 | 15.7 |
| | | | | | | | 3.60 | 1.50 | 350 | — | — | 5.5 | 4.6 |
| Comparison Example 11 | 100 | 0 | 0 | 85 | 15 | 1.37 | 2.30 | 1.80 | 350 | 3.1 | 85 | 60.5 | 19.0 |
| | | | | | | | 3.40 | 1.80 | 350 | 6.6 | 23 | 5.5 | 1.7 |
| Example 32 | 100 | 0 | 25 | 0 | 75 | 0.64 | 2.30 | 1.80 | 350 | 4.1 | 61 | 12.5 | 14.6 |
| | | | | | | | 3.40 | 1.35 | 350 | 5.5 | 41 | 3.5 | 9.0 |
| Example 33 | 100 | 0 | 60 | 0 | 50 | 0.57 | 2.30 | 1.80 | 350 | 3.6 | 56 | 16.5 | 16.3 |
| | | | | | | | 3.20 | 1.50 | 350 | 4.6 | 48 | 5.0 | 10.1 |
| Comparison Example 12 | 100 | 0 | 75 | 0 | 25 | 0.74 | 2.30 | 1.80 | 350 | 3.3 | 76 | 44.0 | 10.7 |
| | | | | | | | 3.60 | 1.50 | 350 | 6.4 | 35 | 3.0 | 1.1 |
| Example 34 | 0 | 100 | 25 | 0 | 75 | 1.05 | | | | | | | |
| | | | | | | | 3.20 | 1.50 | 350 | 3.9 | 29 | 5.5 | 12.2 |
| Example 35 | 0 | 100 | 50 | 0 | 50 | 1.06 | | | | | | | |
| | | | | | | | 3.20 | 1.50 | 350 | 3.7 | 35 | 8.0 | 10.7 |
| Example 36 | 0 | 100 | 0 | 25 | 75 | 0.47 | 2.30 | 1.80 | 330 | 3.2 | 68 | 23.5 | 14.2 |
| Comparison Example 13 | 0 | 100 | 0 | 75 | 25 | 1.67 | 2.30 | 1.80 | 300 | 4.8 | 39 | 75 | 7.4 |
| | | | | | | | 2.30 | 1.80 | 350 | 3.9 | 57 | 56 | 11.5 |

EXAMPLES 37 THROUGH 40 AND COMPARISON EXAMPLE 14

In each of the Examples 37 through 40, procedures identical to those described in Example 1 were used, except that the poly-m-xylylene isophthalamide was prepared by the same method as that described in Example 4 and had an inherent viscosity of 0.76; the extrusion of the spinning solution was carried out at a velocity of 8.0 m/minute, the temperature of the drawing hot plate was 360° C., the ratio in weight of the poly-m-phenylene isophthalamide to the N-methyl-2-pyrrolidone was 19.5:80.5, and the poly-m-phenylene isophthalamide and the poly-m-xylylene isophthalamide were respectively used in an amount as indicated in Table 8.

In Comparison Example 14, the same procedures as those set forth in Examples 37 through 40 were used, except that no poly-m-xylylene isophthalamide was used and the ratio in weight of the poly-m-phenylene isophthalamide to the N-methyl-2-pyrrolidone was 21.5:78.5.

The properties of the filaments of Examples 37 through 40 and Comparison Example 14 are shown in Table 14.

TABLE 8

| Example No. | Composition | | Filaments | | | |
|---|---|---|---|---|---|---|
| | Poly-m-phenylene isophthalamide (A) (%) | Poly-m-xylylene isophthalamide (B) (%) | Tensile strength (g/d) | Ultimate elongation (%) | Shrinkage at 300° C. (%) | K/S |
| Example 37 | 84 | 16 | 4.5 | 33 | 6.5 | 9.1 |
| Example 38 | 82 | 18 | 4.0 | 35 | 6.5 | 13.1 |
| Example 39 | 80 | 20 | 3.8 | 35 | 6.5 | 14.1 |
| Example 40 | 78 | 22 | 3.8 | 35 | 6.5 | 15.5 |
| Comparison Example 14 | 100 | 0 | 5.7 | 30 | 5.0 | 2.5 |

In Table 8, the values of K/S of the filaments were determined in the following manner.

10.0 g of filaments were dyed by using a dyeing liquor having the following composition.

C.I. Basic Blue 41: 0.6 g (6% owf)
Acetic acid: 0.1 ml
NaNO₃: 8.0 g
Water: 300 ml The dyeing operation was carried out at a temperature of 140° C. for 90 minutes. The dyed filaments were soaped with a solution of 0.2 g of Scourol #400 in 300 ml of water, at a temperature of 100° C., for 30 minutes, and then, washed with fresh water. After drying, the filaments were subjected to the determination of the K/S value in the same manner as that mentioned hereinbefore, except that the reflectivity of the filaments was measured at a wave length of 615 millimicrons.

EXAMPLE 41 AND COMPARISON EXAMPLE 15

The filaments of Example 38 and Comparison Example 14 were respectively divided into ten portions, each having a weight of 5.0 g. Each one portion of the filaments of Example 38 and each one portion of the filaments of Comparison Example 14 were dyed together in a dyeing liquor under the dyeing conditions shown below.

| Dyeing liquor A | |
|---|---|
| composition | |
| C.I.Acid Red 6 | 0.6 g (6.0% owf) |
| Carrier (as shown in Table 9) | An amount as shown in Table 9 |
| Acetic acid | 6.0 g |
| (NH₄)₂SO₄ | 22.5 g |
| Water | 300 ml |
| Liquor ratio: 1/30 | |
| Temperature: 130° C. | |
| Time: 90 minutes | |

The dyed filaments were soaped with a solution of 0.5 g of sodium carbonate in 300 ml of water, at a temperature of 80° C., for 20 minutes. The K/S value of the filaments was determined at a wave length of 520 millimicrons.

| Dyeing liquor B | |
|---|---|
| Composition | |
| C.I.Basic Yellow 28 | 0.6 g (6.0% owf) |
| Carrier (as indicated in Table 9) | An amount as indicated in Table 9 |
| Acetic acid | 0.06 g |
| NaNo₃ | 7.5 g |
| Water | 300 ml |
| Liquor ratio: 1/30 | |
| Temperature: 130° C. | |

-continued

| Dyeing liquor B | |
|---|---|
| Composition | |
| Time: 90 minutes | |

The dyed filaments were soaped with a solution of 0.2 g of Scourol #400 (a trademark of a non-ionic surface active agent made by Du Pont) in 300 ml of water, at a temperature of 100° C., for 30 minutes. The K/S value of the filaments was measured at a wave length of 470 millimicrons.

Dyeing liquor C

The composition of Dyeing liquor C was the same as that of Dyeing liquor B, except that Diacryl Red MS-N which is a trademark of a basic dye made by Mitsubishi Kasei Kogyo K. K., Japan, was used in place of C.I. Basic Yellow 28. The dyeing conditions for the filaments with Dyeing liquor C are the same as those of Dyeing liquor B. Also, the dyed filaments were soaped in the same manner as the filaments dyed with dyeing liquor B. The K/S value of the dyed filaments was measured at a wave length of 550 millimicrons.

| Dyeing liquor D | |
|---|---|
| Composition | |
| C.I.Disperse Blue 139 | 0.8 g (8% owf) |
| Carrier (as indicated in Table 9) | An amount as indicated in Table 9 |
| Acetic acid | 0.15 g |
| Water | 300 ml |
| Liquor ratio: 1/30 | |
| Temperature: 130° C. | |
| Time: 90 minutes | |

The dyed filaments were soaped with a solution of 0.6 g of Scourol #400 and 0.6 g of Na₂CO₃ in 300 ml of water, at a temperature of 80° C., for 20 minutes. The K/S value of the dyed filaments was measured at a wave length of 620 millimicrons.

The K/S values of the above-dyed filaments are shown in Table 9.

TABLE 9

| Dyeing liquor | Carrier | | K/S | |
|---|---|---|---|---|
| | Type | Amount | Example 41 | Comparison Example 15 |
| A | p-phenyl phenol | 20% owf | 19.0 | 1.8 |
| | Acetophenone | 80% owf | 9.7 | 1.34 |
| B | p-phenyl phenol | 20% owf | 17.5 | 2.6 |
| | Acetophenone | 80% owf | 19.0 | 4.8 |
| | Dimethyl phthalate | 20% owf | 17.5 | 1.8 |
| | none | | 8.0 | 1.0 |
| C | p-phenyl phenol | 20% owf | 19.9 | 3.1 |

TABLE 9-continued

| Dyeing liquor | Carrier | | K/S | |
| --- | --- | --- | --- | --- |
| | Type | Amount | Example 41 | Comparison Example 15 |
| | Acetophenone | 80% owf | 19.1 | 7.0 |
| | Dimethyl phthalate | 20% owf | 19.2 | 2.3 |
| | none | | 12.0 | 1.6 |
| D | p-phenyl phenol | 20% owf | 9.3 | 0.8 |
| | none | | 4.6 | 0.5 |

What we claim is:

1. An aromatic polyamide composition comprising:
   (A) 50 to 95% by weight of poly-m-phenylene isophthalamide, and;
   (B) 5 to 50% by weight of at least one other aromatic polyamide comprising:
   (1) an amine moiety consisting essentially of (a) 35 to 100 molar % of at least one xylylene diamine and, (b) 0 to 65 molar % of at least one other aromatic diamine, and;
   (2) an acid moiety consisting essentially of at least one aromatic dicarboxylic acid.

2. An aromatic polyamide composition as claimed in claim 1, wherein said xylylene diamine (a) is selected from the group consisting of m-xylylene diamine and p-xylylene diamine, and said xylylene diamine may be either unsubstituted or substituted with at least one substituent which is not reactive to acid halide radicals and amino radicals and which is bonded to the aromatic ring of said xylylene diamine.

3. An aromatic polyamide composition as claimed in claim 2, wherein said substituent in said xylylene diamine is selected from the group consisting of halogen atoms, alkyl radicals, a phenyl radical, carboalkoxy radicals, a nitro radical, alkoxy radicals and thioalkyl radicals.

4. An aromatic polyamide composition as claimed in claim 3, wherein said alkyl radical has 1 to 4 carbon atoms, said carboalkoxy radical has an alkoxy group having 1 to 3 carbon atoms, said alkoxy radical has 1 to 3 carbon atoms and said thioalkyl radical has 1 to 3 carbon atoms.

5. An aromatic polyamide composition as claimed in claim 1, wherein said other aromatic diamine (b) in said other aromatic polyamide (B) is selected from the group consisting of phenylene diamines, naphthylene diamines, biphenylene diamines, diphenylether diamines, diphenylthioether diamines, diphenylmethane diamines and diphenylsulfone diamines, and said aromatic diamine (b) may be either unsubstituted or substituted with at least one substituent which is not reactive to acid halide radicals and amino radicals, and which is bonded to the aromatic ring in said aromatic diamine compound.

6. An aromatic polyamide composition as claimed in claim 5, wherein said substituent in said other aromatic diamine is selected from the group consisting of halogen atoms, alkyl radicals having 1 to 4 carbon atoms, a phenyl radical, carboalkoxy radicals in which said alkoxy group has 1 to 3 carbon atoms, a nitro radical, alkoxy radicals having 1 to 3 carbon atoms and thioalkyl radicals having 1 to 3 carbon atoms.

7. An aromatic polyamide composition as claimed in claim 1, wherein said aromatic dicarboxylic acid is selected from the group consisting of phenylene dicarboxylic acids, naphthalene dicarboxylic acids and mixtures of the above-mentioned aromatic dicarboxylic acids, and the above-mentioned aromatic dicarboxylic acid may be either unsubstituted or substituted with at least one substituent which is bonded to an aromatic ring of said aromatic dicarboxylic acid and which is not reactive to acid halide radicals and amino radicals.

8. An aromatic polyamide composition as claimed in claim 7, wherein said substituent in said aromatic dicarboxylic acid is selected from the group consisting of halogen atoms, alkyl radicals having 1 to 4 carbon atoms, phenyl radical, carboalkyl radicals in which said alkyl group has 1 to 3 carbon atoms, alkoxy radicals having 1 to 3 carbon atoms, a nitro radical and thioalkyl radical having 1 to 3 carbons atoms.

9. An aromatic polyamide composition as claimed in claim 1, wherein said poly-m-phenylene isophthalamide (A) has an inherent viscosity of from 1.0 to 3.0, determined in concentrated sulfuric acid, at a concentration of 0.5 g/dl of said poly-m-phenylene isophthalamide, at a temperature of 30° C.

10. An aromatic polyamide composition as claimed in claim 1, wherein said other aromatic polyamide (B) has an inherent viscosity of from 0.1 to 1.5, determined in concentrated sulfuric acid, at a concentration of 0.5 g/dl of said polyamide (B), at a temperature of 30° C.

11. Filaments or fibers consisting essentially of the aromatic polyamide composition as claimed in claim 1.

12. Filaments or fibers as claimed in claim 11, which have a thermal shrinkage of 30% or less at a temperature of 300° C.

* * * * *

UNITED STATES PATENT AND TRADEMARK OFFICE
CERTIFICATE OF CORRECTION

PATENT NO. : 4,278,779
DATED : July 14, 1981
INVENTOR(S) : Yasuo Nakagawa, et al It is certified that error appears in the above—identified patent and that said Letters Patent is hereby corrected as shown below:

In the Title Page: after the inventors' names and addresses, insert the following paragraph: --Assignee: Teijin Ltd., Osaka, Japan--.

Column 1, line 43: "example as," should be --example, as--.

Column 3, line 20: "that is the," should be --that is, the--.

Column 9, line 52: after "were", insert --used--.

Signed and Sealed this

Twentieth Day of July 1982

[SEAL]

Attest:

GERALD J. MOSSINGHOFF

Attesting Officer

Commissioner of Patents and Trademarks